United States Patent
Sawada et al.

(10) Patent No.: US 8,973,353 B2
(45) Date of Patent: Mar. 10, 2015

(54) EXHAUST GAS POST-TREATMENT UNIT AND CONSTRUCTION VEHICLE CARRYING SAME

(71) Applicant: Komatsu Ltd., Tokyo (JP)

(72) Inventors: Masahiro Sawada, Hirakata (JP); Takashi Katou, Oyama (JP); Kanji Namimatsu, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/234,474

(22) PCT Filed: Mar. 15, 2013

(86) PCT No.: PCT/JP2013/057519
§ 371 (c)(1),
(2) Date: Jan. 23, 2014

(87) PCT Pub. No.: WO2014/141478
PCT Pub. Date: Sep. 18, 2014

(65) Prior Publication Data
US 2014/0290222 A1 Oct. 2, 2014

(51) Int. Cl.
*F01N 3/00* (2006.01)
*F01N 3/10* (2006.01)
(Continued)

(52) U.S. Cl.
CPC ........... *F01N 3/10* (2013.01); *F01N 2610/1453* (2013.01); *F01N 3/24* (2013.01); *F01N 2610/11* (2013.01); *F01N 3/2066* (2013.01)
USPC .................... 60/295; 60/286; 60/297; 60/301; 60/303; 60/320

(58) Field of Classification Search
USPC ............ 60/286, 295, 297, 301, 303, 311, 320
See application file for complete search history.

(56) References Cited

U.S. PATENT DOCUMENTS

2007/0092413 A1* 4/2007 Hirata et al. .................. 422/177
2008/0134677 A1* 6/2008 Onodera ......................... 60/601
(Continued)

FOREIGN PATENT DOCUMENTS

| JP | 59-174320 U | 11/1984 |
|---|---|---|
| JP | 62-63118 A | 3/1987 |
| JP | 7-332182 A | 12/1995 |
| JP | 2006-226236 A | 8/2006 |
| JP | 2009-103013 A | 5/2009 |
| JP | 2011-140853 A | 7/2011 |

(Continued)

OTHER PUBLICATIONS

The International Search Report for the corresponding international application No. PCT/JP2013/057519, issued on Jun. 11, 2013.
(Continued)

*Primary Examiner* — Audrey K Bradley
(74) *Attorney, Agent, or Firm* — Global IP Counselors, LLP (57) ABSTRACT

An exhaust gas post-treatment unit includes a diesel particulate filtering device that treats engine exhaust gas, a selective catalyst reduction device that treats the engine exhaust gas, a connecting pipe, an injection device, a cooling water supply pipe and a cooling water return pipe. The connecting pipe connects the diesel particulate filtering device and the selective catalyst reduction device. The injection device is disposed on the connecting pipe and injects a reducing agent into the exhaust gas supplied to the selective catalyst reduction device. The a cooling water supply pipe guides cooling water to the injection device to cool the injection device. The cooling water return pipe discharges the cooling water from the injection device. At least one of the cooling water supply pipe and the cooling water return pipe has a convection section extending upward along the connecting pipe from a connecting portion with the injection device.

18 Claims, 7 Drawing Sheets

(51) Int. Cl.
*F01N 3/02* (2006.01)
*F01N 5/02* (2006.01)
*F01N 3/24* (2006.01)
*F01N 3/20* (2006.01)

(56) References Cited

U.S. PATENT DOCUMENTS

2010/0242439 A1* 9/2010 Domon et al. .................. 60/274
2011/0120085 A1* 5/2011 Saito et al. ...................... 60/272
2013/0219871 A1* 8/2013 Crandell et al. ................ 60/295

FOREIGN PATENT DOCUMENTS

| | | |
|---|---|---|
| JP | 2012-107578 A | 6/2012 |
| JP | 2013-11109 A | 1/2013 |
| JP | 2013-47488 A | 3/2013 |

OTHER PUBLICATIONS

The Office Action for the corresponding Japanese application No. 2013-539066, issued on Nov. 26, 2013.
International Search Report for the corresponding international application No. PCT/JP2013/075252, issued on Nov. 12, 2013.

* cited by examiner

EXHAUST GAS POST-TREATMENT UNIT AND CONSTRUCTION VEHICLE CARRYING SAME

CROSS-REFERENCE TO RELATED APPLICATIONS

This application is a U.S. National stage application of International Application No. PCT/JP2013/057519, filed on Mar. 15, 2013.

BACKGROUND

1. Field of the Invention

The present invention relates to an exhaust gas post-treatment unit and a construction vehicle carrying the same.

1. Background Information

Generally a diesel engine is used for the engine in a construction vehicle. Exhaust gas discharged from a diesel engine contains many nitrogen oxide compounds. A construction vehicle is provided with an exhaust gas post-treatment unit to purify the nitrogen oxide compounds in the exhaust gas (see, for example, Japanese Patent Laid-open No. 2011-140853).

The exhaust gas post-treatment unit is equipped with an injection device and a selective catalyst reduction device. The injection device injects a reducing agent into the exhaust gas upstream from the selective catalyst reduction device. As a result, the nitrogen oxides in the exhaust gas discharged from the engine are reduced to nitrogen. Since the injection device is heated by radiant heat from the engine and heat from the exhaust gas, the sealing members and rubber members of the injection device tend to deteriorate.

SUMMARY

In order to prevent the deterioration of the members in the injection device, cooling water for cooling the engine, for example, may also be supplied to the injection device to cool the injection device. The cooling water for cooling the engine is circulated by using a cooling water pump driven by obtaining motive power from the engine. As a result, circulation of the cooling water is stopped when the engine is stopped since the cooling water pump is also stopped. However, the injection device still needs to be cooled after the engine has stopped since radiant heat from the engine is emitted even after the engine has stopped.

An object of the present invention is to cool the injection device even after the engine has stopped.

(1) An exhaust gas post-treatment unit according to a first aspect of the present invention is equipped with a diesel particulate filtering device, a selective catalyst reduction device, a connecting pipe, an injection device, a cooling water supply pipe, and a cooling water return pipe. The diesel particulate filtering device and the selective catalyst reduction device treat exhaust gas from the engine. The connecting pipe connects the diesel particulate filtering device and the selective catalyst reduction device. The injection device is disposed on the connecting pipe and injects a reducing agent into the exhaust gas supplied to the selective catalyst reduction device. The cooling water supply pipe guides the cooling water for cooling the injection device to the injection device. The cooling water return pipe discharges the cooling water from the injection device. At least one of the cooling water supply pipe and the cooling water return pipe has a convection section that extends upward along the connecting pipe from a connecting portion with the injection device.

According to this configuration, the convection section extends upward from the injection device. The cooling water is stored inside the convection section even after the engine has stopped. As a result, even after the engine has stopped, cooling water that has become hot after absorbing heat from the injection device moves upward inside the convection section, and cooling water with a relatively lower temperature at the top of the convection section moves downward toward the injection device. Specifically, heat convection is generated in the cooling water stored inside the convection section after the engine has stopped. In this way, the injection device is cooled due to heat convection in the cooling water stored inside the convection section in at least one of the cooling water supply pipe and the cooling water return pipe even after the engine has stopped. The convection section which extends upward through the entirety thereof may have a portion that extends horizontally if an allowable degree of heat convection is present in the cooling water inside the convection section due to heat from the injection device.

(2) The convection section preferably extends obliquely upward from the injection device along the longitudinal direction of the connecting pipe. Specifically, the convection section extends upward from the injection device in a state of being inclined. A construction vehicle in which the exhaust gas post-treatment unit having the convection section is mounted inside the engine room may have an engine hood height that is higher than a conventional construction vehicle due to the convection section extending upward. Accordingly, since the convection section does not extend upward vertically from the injection device but extends obliquely upward as described above, the above problem can be resolved while allowing the abovementioned heat convection to be conducted. Moreover, when the exhaust gas post-treatment unit is housed in, for example, the engine room, the convection section can be housed effectively inside the engine room due to the convection section being installed along the longitudinal direction of the connecting pipe.

(3) The exhaust gas post-treatment unit preferably further includes a cooling water pump. The cooling water pump is driven by obtaining motive power from the engine to supply cooling water to the injection device via a cooling water supply pipe. According to this configuration, here is no need to install a new motive power source other than the engine since the motive power of the cooling water pump for supplying the cooling water to the injection device can be obtained from the engine. The present invention is particularly effective when cooling water is supplied to the injection device by using the cooling water pump that is stopped when the engine is stopped in this way.

(4) The exhaust gas post-treatment unit preferably further includes a reservoir part. The reservoir part is connected to the convection section above the injection device and stores cooling water. According to this configuration, since cooling water is stored in the reservoir part, the capacity of cooling water for cooling the injection device after the engine has stopped can be increased. The reservoir part may be connected to the convection section in the middle of the convection section.

(5) The exhaust gas post-treatment unit preferably further includes a first supporting member for supporting the convection section. According to this configuration, an orientation in which the convection section extends upward from the injection device can be maintained and stable heat convection can be achieved with the cooling water inside the convection section after the engine has stopped.

(6) The exhaust gas post-treatment unit preferably further includes a second supporting member. The second supporting member is installed on the connecting pipe and supports the reservoir part. According to this configuration, since the reservoir part can be stably supported by the second supporting member above the injection device, the abovementioned heat convection can be stably achieved and the injection device can be cooled in a reliable manner.

(7) A construction vehicle according to a second aspect of the present invention is provided with any one of the abovementioned exhaust gas post-treatment units, an engine, and working equipment. According to this configuration, the injection device can be cooled by heat convection of the cooling water inside the convection section even after the engine has stopped since the abovementioned exhaust gas post-treatment unit is provided.

(8) The exhaust gas post-treatment unit may be disposed above the engine.

According to the present invention, the injection device can be cooled even after the engine has stopped.

DETAILED DESCRIPTION OF EMBODIMENT(S)

Figure 1:
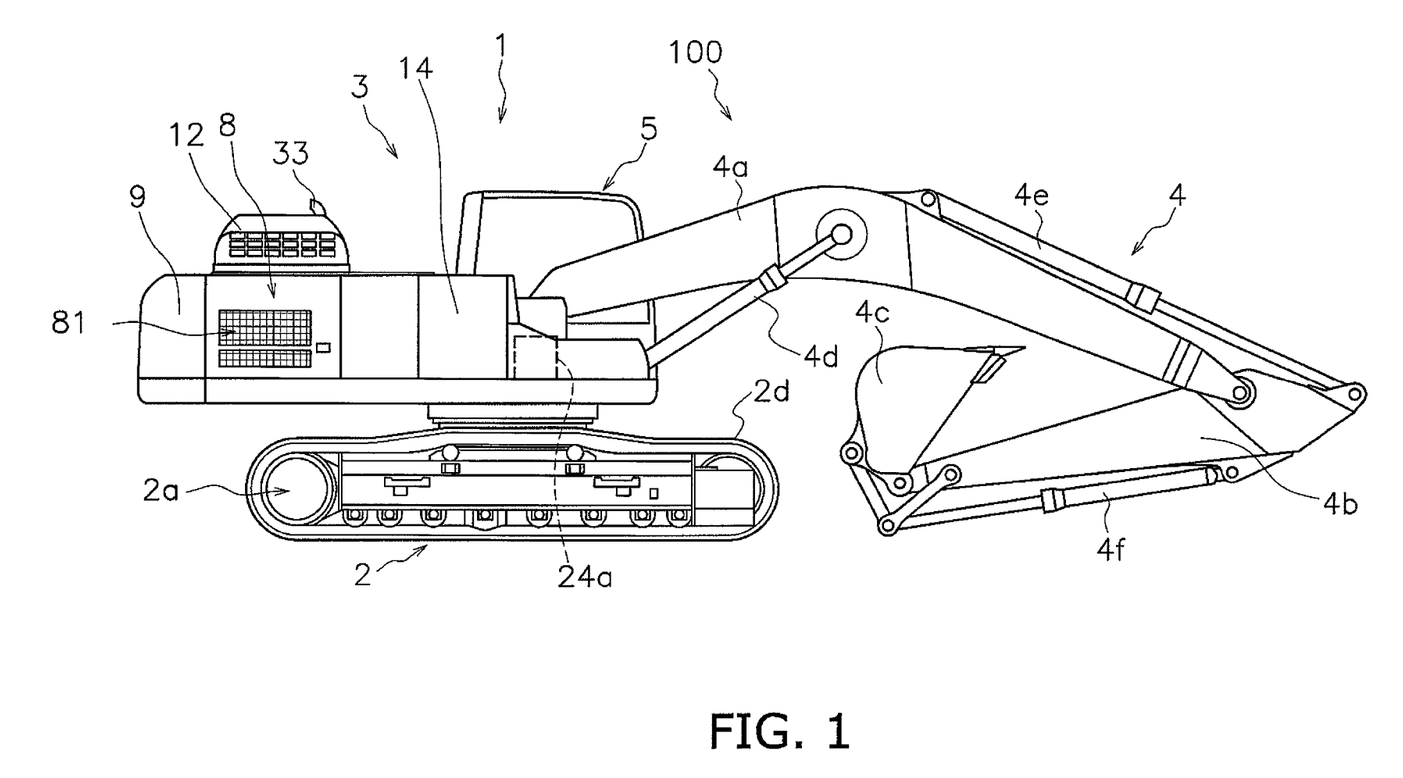
FIG. 1 is a right side view of a hydraulic excavator.
Figure 2:
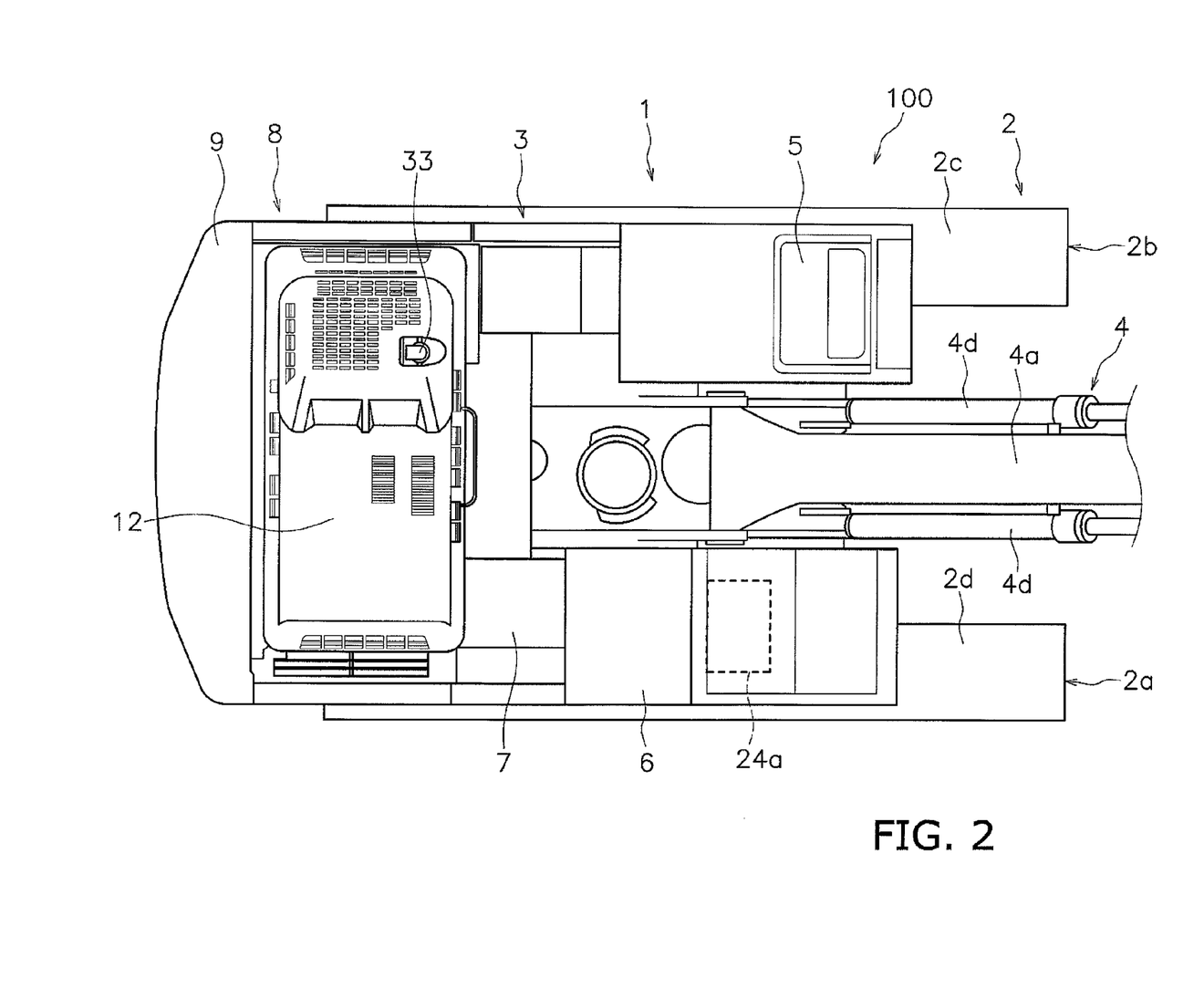
FIG. 2 is a plan view of the hydraulic excavator.

The following is an explanation of an exhaust gas post-treatment unit (abbreviated to "exhaust gas treatment unit") 20 according to an embodiment of the present invention, and a hydraulic excavator 100 that carries the exhaust gas post-treatment unit 20. FIG. 1 is a side view of the hydraulic excavator 100, and FIG. 2 is a plan view of the hydraulic excavator 100. In the following explanation, "front" and "rear" refer to the front and the rear of a vehicle body 1. That is, the right side is the "front" and the left side is the "rear" in FIGS. 1 and 2. In the following description, "right," "left," "up," and "down" indicate directions relative to a state of looking forward from the driver's seat, and "vehicle width direction" and "left-right direction" have the same meaning.

As illustrated in FIGS. 1 and 2, the hydraulic excavator (example of a construction vehicle) 100 includes the vehicle body 1 and working equipment 4, and the working equipment 4 is used for performing desired work.

The vehicle body 1 has an undercarriage 2 and a revolving superstructure 3. As illustrated in FIG. 2, the undercarriage 2 has a pair of travel devices 2a, 2b. The travel device 2a has a crawler belt 2d and the travel device 2b has a crawler belt 2c. The travel devices 2a, 2b allow the hydraulic excavator 100 to travel due to the crawler belts 2c, 2d being driven by driving power from a belowmentioned engine 10 (see FIG. 3).

As illustrated in FIGS. 1 and 2, the revolving superstructure 3 is mounted on the undercarriage 2, and is provided in a manner that allows revolution in relation to the undercarriage 2. The revolving superstructure 3 has an operating cabin 5, a fuel tank 6, an operating fluid tank 7, an engine room 8, and a counterweight 9.

The fuel tank 6 stores fuel for driving the engine 10 and is disposed in front of the operating fluid tank 7. The operating fluid tank 7 stores operating fluid discharged from a belowmentioned hydraulic pump 11 (see FIG. 3). The operating fluid tank 7 is disposed in a line in the front-back direction with the fuel tank 6.

The engine room 8 houses equipment such as the engine 10, the hydraulic pump 11, the exhaust gas post-treatment unit 20 and the like as described below. The engine room 8 is disposed to the rear of the operating cabin 5, the fuel tank 6, and the operating fluid tank 7. An engine hood 12 is disposed above the engine room 8. The counterweight 9 is disposed to the rear of the engine room 8.

The working equipment 4 is attached at the front of the revolving superstructure 3. The working equipment 4 includes a boom 4a, an arm 4b, a bucket 4c, a boom cylinder 4d, an arm cylinder 4e, and a bucket cylinder 4f. The proximal end of the boom 4a is coupled to the revolving superstructure 3 in a rotatable manner. The proximal end of the arm 4b is coupled to the distal end of the boom 4a in a rotatable manner. The bucket 4c is coupled to the distal end of the arm 4b in a rotatable manner. The boom cylinder 4d, the arm cylinder 4e, and the bucket cylinder 4f are hydraulic cylinders and are driven by operating fluid discharged from the belowmentioned hydraulic pump 11. The boom cylinder 4d actuates the boom 4a. The arm cylinder 4e actuates the arm 4b. The bucket cylinder 4f actuates the bucket 4c. The driving of the cylinders 4d, 4e, and 4f drives the working equipment 4.

Figure 3:
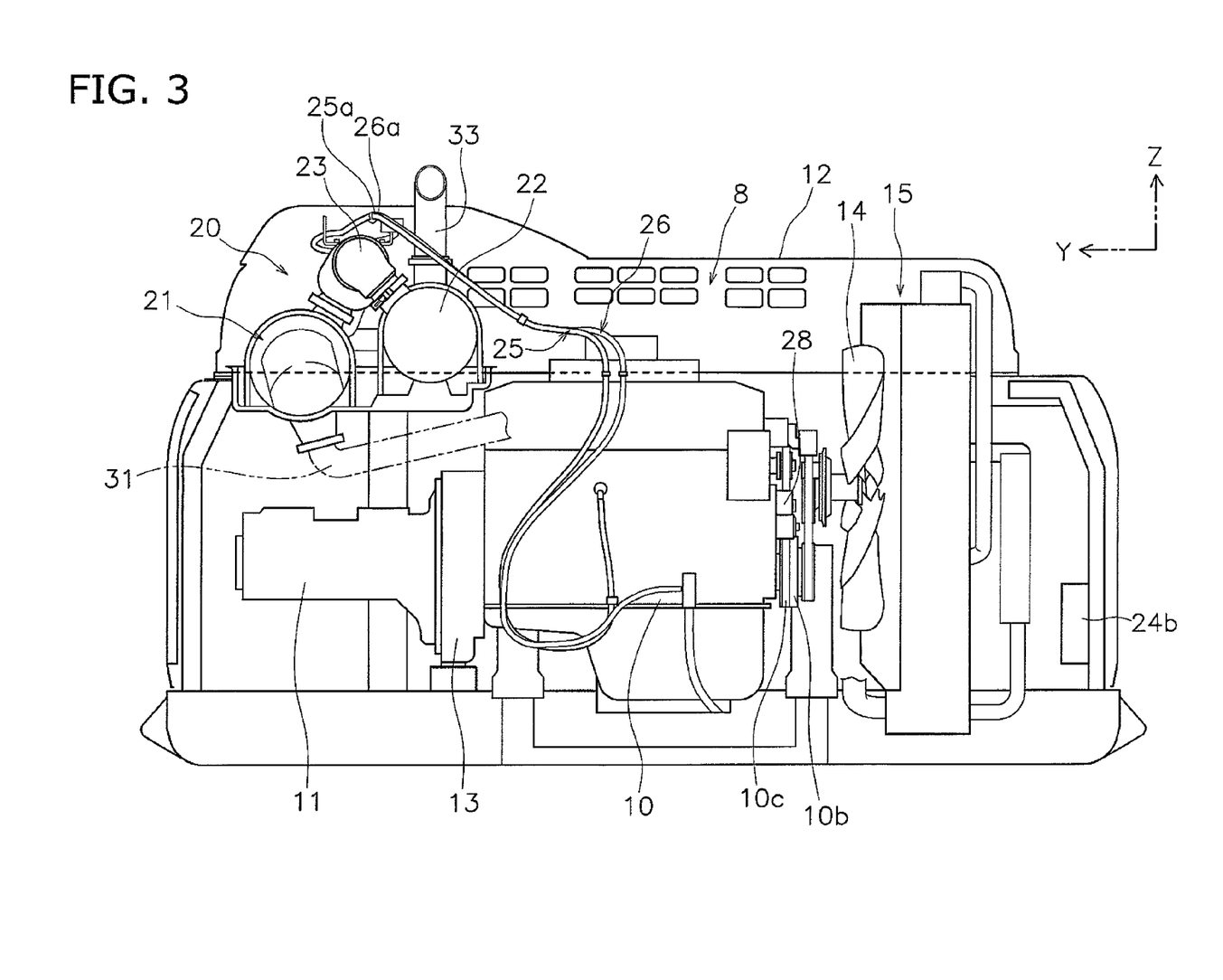
FIG. 3 illustrates the inside of an engine room as seen from the rear.

FIG. 3 illustrates the internal structure of the engine room 8 as seen from the rear of the vehicle. As illustrated in FIG. 3, the engine 10, a flywheel housing 13, the hydraulic pump 11, the exhaust gas post-treatment unit 20, a fan 14, and a radiator 15 are disposed in the engine room 8. The fan 14 produces an air current to be blown from the right to the left inside the engine room 8. The radiator 15 is disposed on the right side of the fan 14. Cooling air is introduced into the engine room 8 from outside through air vent holes 81 (see FIG. 1) when the fan 14 is operating. The cooling water flowing inside the radiator 15 is cooled by the cooling air. The engine 10, the flywheel housing 13, and the hydraulic pump 11 are disposed in a row in the vehicle width direction.

The hydraulic pump 11 is driven by the engine 10. The hydraulic pump 11 is disposed on the left side of the engine 10. The flywheel housing 13 is disposed between the engine 10 and the hydraulic pump 11. The flywheel housing 13 is attached to the left side surface the engine 10. The hydraulic pump 11 is attached to the left side surface the flywheel housing 13.

Figure 4:
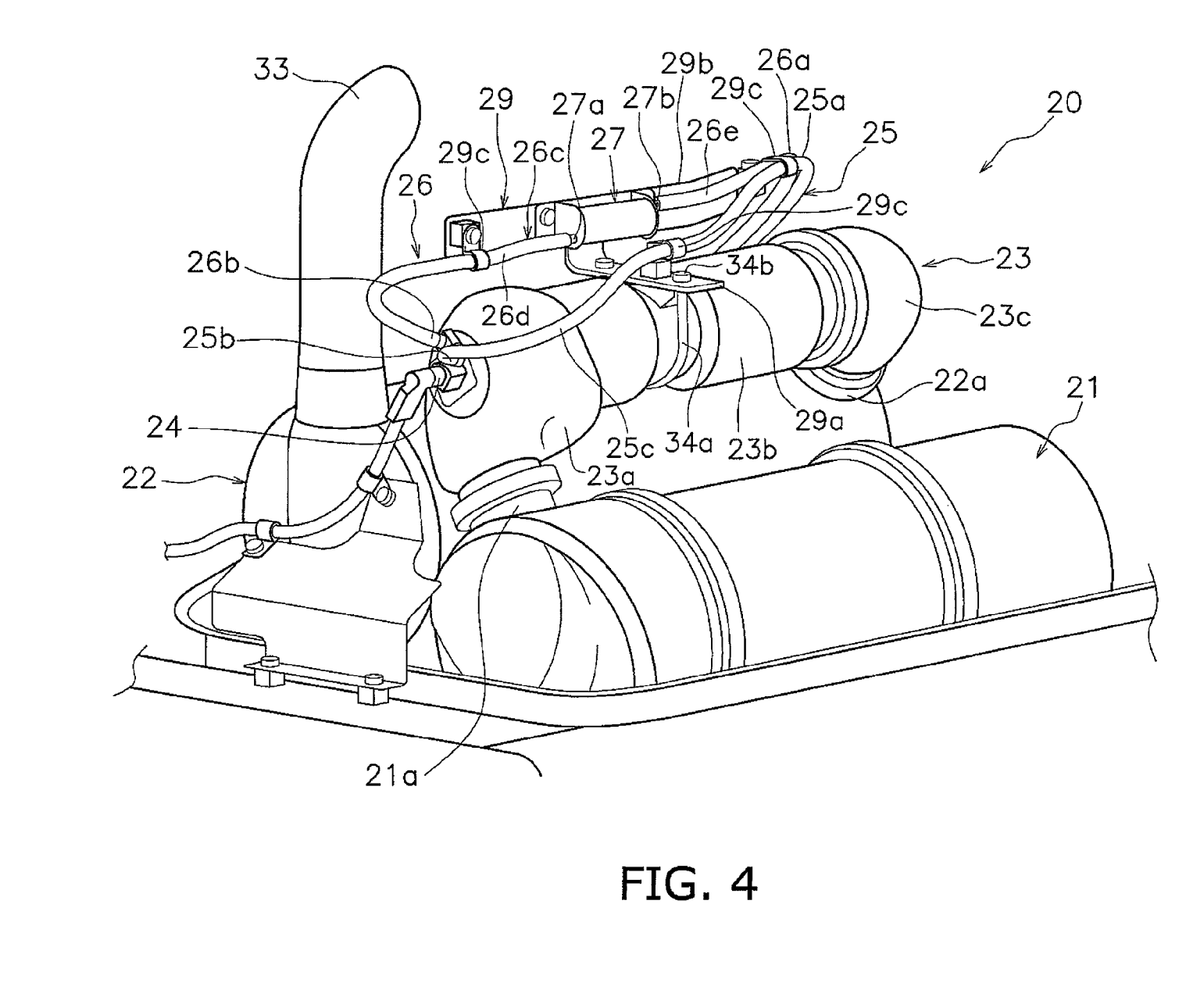
FIG. 4 is a perspective view of an exhaust gas post-treatment unit with the engine hood removed as seen from the front left.

FIG. 4 is a perspective view of the exhaust gas post-treatment unit 20 with the engine hood 12 removed as seen from the front left. The exhaust gas post-treatment unit 20 treats exhaust gas from the engine 10. As illustrated in FIGS. 3 and 4, the exhaust gas post-treatment unit 20 has a diesel particulate filtering device (DPF) 21, a selective catalyst reduction device (SCR) 22, a connecting pipe 23, and an injection device 24. The exhaust gas post-treatment unit 20 has a cooling water supply pipe 25, a cooling water return pipe 26, and a tank 27 (example of a reservoir part).

The diesel particulate filtering device 21 is a device for treating exhaust gas from the engine 10. The exhaust gas is supplied from the engine 10 to the diesel particulate filtering device 21 via a turbo charger 32 (see FIG. 6) and a pipe 31. Specifically, the diesel particulate filtering device 21 is a device that collects, in a filter, particulate matter included in the exhaust gas. The diesel particulate filtering device 21 burns the collected particulate matter with a heater provided with the filter. The diesel particulate filtering device 21 has a roughly cylindrical shape and is disposed so that the longitudinal direction thereof extends in the front-back direction.

The connecting pipe 23 is a pipe for connecting the diesel particulate filtering device 21 and the selective catalyst reduction device 22, and is disposed above the engine 10. The entire connecting pipe 23 is formed in an S-shape and includes a first bend section 23a, a linear section 23b, and a second bend section 23c. One end of the first bend section 23a is connected to an exhaust gas outlet 21a of the diesel particulate filtering device 21 and the other end of the first bend section 23a is connected to one end of the linear section 23b. One end of the second bend section 23c is connected to an exhaust gas inlet 22a of the selective catalyst reduction device 22, and the other end is connected to the other end of the linear section 23b. The linear section 23b extends in the longitudinal direction of the connecting pipe 23 between the first bend section 23a and the second bend section 23c.

Figure 5:
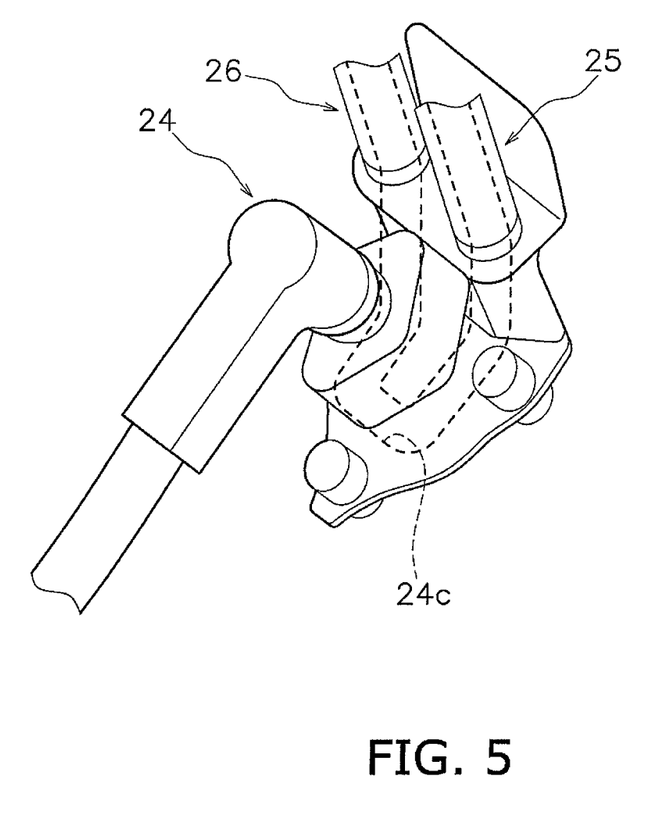
FIG. 5 is a perspective view of a detail of the injection device.

The injection device 24 is attached to the first bend section 23a. The injection device 24 is a device for injecting urea aqueous (example of a reducing agent) sucked up from a urea aqueous tank 24a (see FIG. 1) by a urea aqueous pump 24b, into the connecting pipe 23 in order to add the urea aqueous as a reducing agent to the exhaust gas flowing through the connecting pipe 23. The mixed urea aqueous is hydrolyzed due to the heat of the exhaust gas to become ammonia, and the ammonia is fed with the exhaust gas through the connecting pipe 23 to the selective catalyst reduction device 22. FIG. 5 is a perspective view illustrating a detail of the injection device 24. As illustrated in FIG. 5, the injection device 24 has a cooling water channel 24c through which the cooling water for cooling the injection device body flows. The cooling water channel 24c connects the belowmentioned cooling water supply pipe 25 and the cooling water return pipe 26, and the injection device 24 is cooled due to the cooling water flowing inside cooling water channel.

As illustrated in FIGS. 3 and 4, the selective catalyst reduction device 22 is a device for treating exhaust gas from the engine 10. Specifically, the selective catalyst reduction device 22 reduces nitrogen oxide compounds with the ammonia obtained by the hydrolyzation of the urea. The selective catalyst reduction device 22 has a roughly cylindrical shape and is disposed so that the longitudinal direction thereof extends in the vehicle front-back direction. An exhaust pipe 33 is connected to the selective catalyst reduction device 22 and the exhaust pipe 33 projects upward from the engine hood 12. Exhaust gas treated by the exhaust gas post-treatment unit 20 is discharged to the outside from the exhaust pipe 33.

The diesel particulate filtering device 21, the selective catalyst reduction device 22, the connecting pipe 23, and the injection device 24 are disposed above the engine 10. The diesel particulate filtering device 21, the connecting pipe 23, and the selective catalyst reduction device 22 are disposed parallel to each other. The diesel particulate filtering device 21 and the selective catalyst reduction device 22 are disposed near each other and the longitudinal directions thereof are disposed in a row orthogonal to the vehicle width direction. The engine 10, the selective catalyst reduction device 22, the connecting pipe 23, and the diesel particulate filtering device 21 are disposed in order from the right side in the vehicle width direction.

As illustrated in FIG. 4, a supporting member 29 is fixed to the connecting pipe 23. The supporting member 29 is a member for supporting the convection sections 25c and 26c to maintain an orientation in which the convection sections 25c and 26c extend obliquely upward from the injection device 24 as described below. The supporting member 29 is a roughly T-shaped plate and has a first plate part 29a and a second plate part 29b.

The first plate part 29a is a rectangular plate and the right edge part thereof is bent upward. The first plate part 29a is attached at the approximate center of the connecting pipe 23 by a U-shaped bolt 34a and nuts 34b. The first plate part 29a extends in a direction orthogonal to the longitudinal direction of the connecting pipe 23 in a state of being attached to the connecting pipe 23. Specifically, the first plate part 29a is attached to the connecting pipe 23 so that the longitudinal direction of the first plate part 29a is orthogonal to the longitudinal direction of the connecting pipe 23 (In other words, facing the vehicle width direction).

The second plate part 29b is a rectangular plate and the longitudinal direction thereof extends in the front-back direction (longitudinal direction of the connecting pipe 23). Specifically, the second plate part 29b is disposed so that the longitudinal direction thereof is roughly parallel to the longitudinal direction of the connecting pipe 23. The second plate part 29b is coupled with the right edge of the first plate part 29a at the center part of the second plate part 29b. The first plate part 29a and the second plate part 29b are configured as one member. The supporting member 29 has a plurality of mounting brackets 29c provided on the first plate part 29a and the second plate part 29b. The mounting brackets 29c support the cooling water supply pipe 25 and the cooling water return pipe 26.

Figure 6:
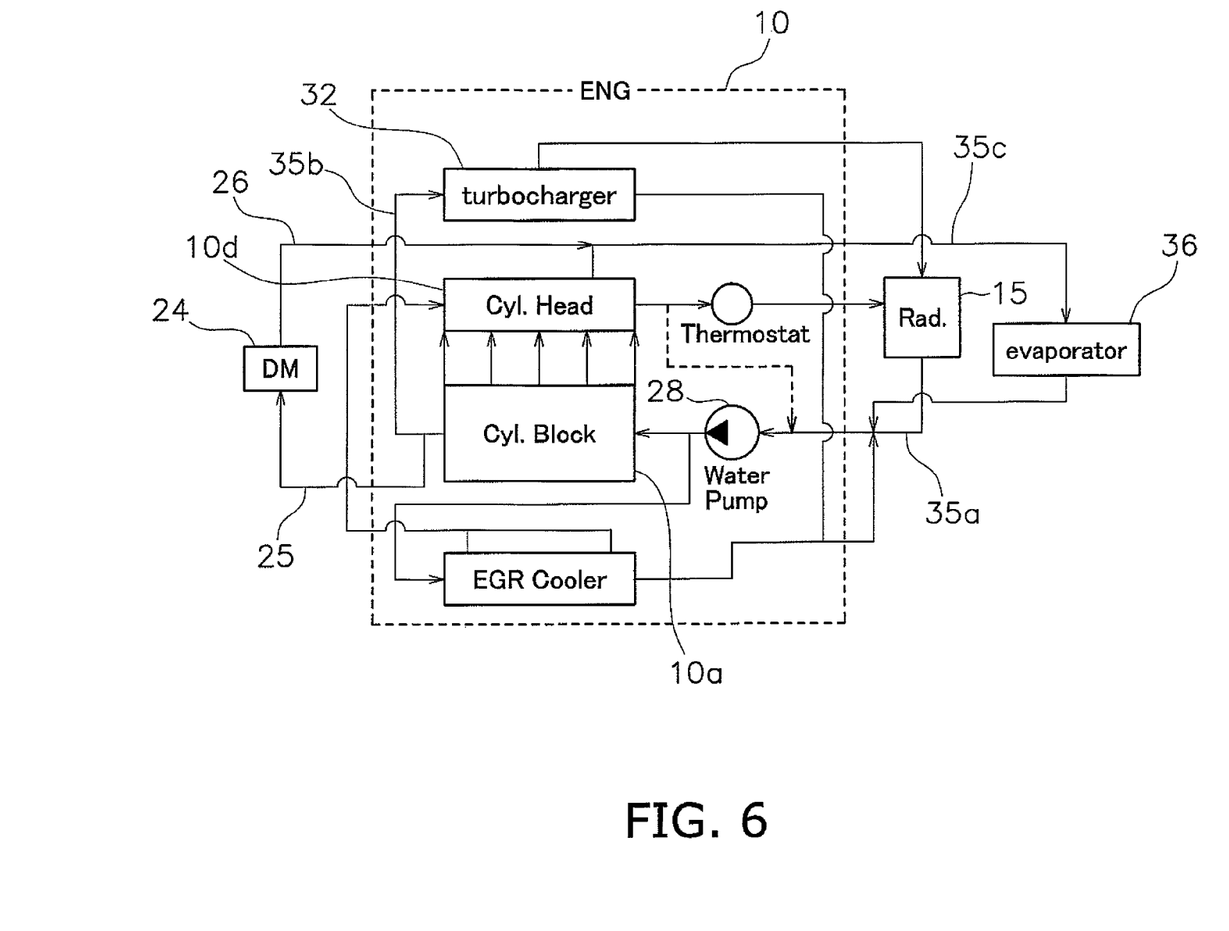
FIG. 6 is a circuit diagram of all the channels for the cooling water.

FIG. 6 is a circuit diagram of all the channels for the cooling water. The main cooling water channels pertaining to the present embodiment will be discussed on the basis of FIG. 6. The hydraulic excavator 100 is mainly provided with a first cooling water pipe 35a, a second cooling water pipe 35b, a third cooling water pipe 35c, the cooling water supply pipe 25, and the cooling water return pipe 26.

The first cooling water pipe 35a connects the radiator 15 with a water jacket of a cylinder block 10a and supplies cooling water cooled by the radiator 15 to the water jacket of the cylinder block 10a. A cooling water pump 28 is provided in the middle of the first cooling water pipe 35a. The cooling water pump 28 is connected to a crankshaft 10b of the engine 10 via a belt 10c as illustrated in FIG. 3. Consequently, the cooling water pump 28 is driven in synchronization with the rotation of the crankshaft 10b of the engine 10 to supply cooling water to the cooling water supply pipe 25. The cooling water pump 28 stops when the engine 10 stops.

As illustrated in FIG. 6, the second cooling water pipe 35b connects the water jacket of the cylinder block 10a with a cooling water channel of the turbo charger 32 to supply cooling water to the cooling water channel of the turbo charger 32 from the water jacket of the cylinder block 10a. The cooling water supply pipe 25 branches from the second cooling water pipe 35b. The cooling water supply pipe 25 connects the second cooling water pipe 35b with a cooling water channel of the injection device 24 to supply cooling water from the second cooling water pipe 35b to the cooling water channel of the injection device 24. Consequently, the injection device 24 is cooled.

The cooling water return pipe 26 connects the cooling water channel of the injection device 24 with the third cooling water pipe 35c to supply cooling water from the cooling water channel of the injection device 24 to the third cooling water pipe 35c. Consequently, the cooling water that has cooled the injection device 24 is discharged from the cooling water channel of the injection device 24.

The third cooling water pipe 35c connects a water jacket of a cylinder head 10d with an evaporator 36 of an air-conditioning device to supply cooling water from the water jacket of the cylinder head 10d to the evaporator 36 of the air-conditioning device. Since a coolant having a low temperature and low pressure due to an expansion valve in the air-conditioning device is flowing inside the evaporator 36, the cooling water supplied to the evaporator 36 is cooled due to heat exchange (heat radiation) with the coolant flowing inside the evaporator 36.

The cooling water supplied to the third cooling water pipe 35c is cooled by the evaporator 36 as described above. The cooling water cooled by the evaporator 36 is supplied to the first cooling water pipe 35a, is mixed with the cooling water cooled by the radiator 15, and is supplied once again to the water jacket of the cylinder block 10a.

Figure 7:
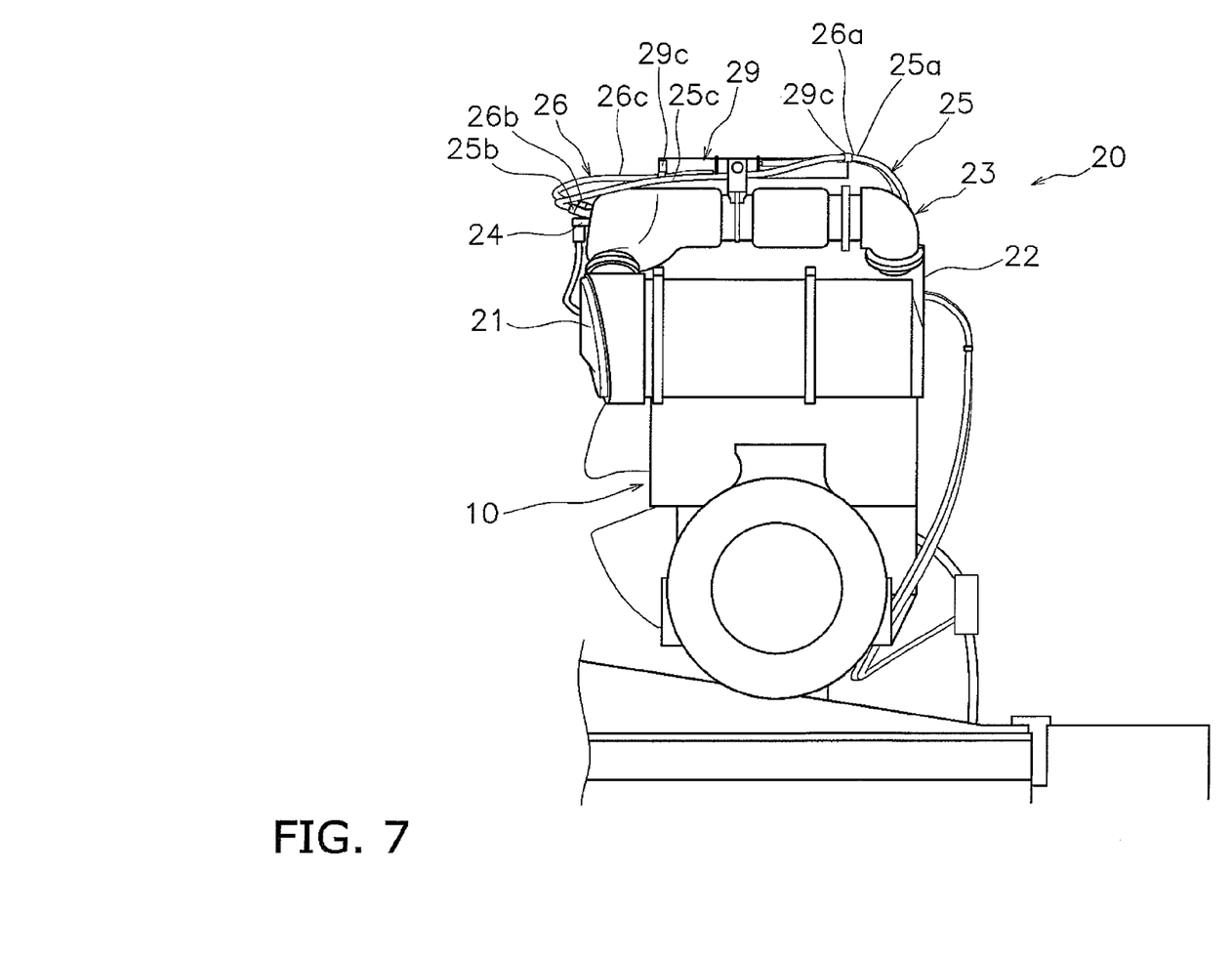
FIG. 7 is a left side view of the exhaust gas post-treatment unit.

FIG. 7 is a left side view of the exhaust gas post-treatment unit. The cooling water supply pipe 25 is a pipe for supplying, to the injection device 24, cooling water cooled by the radiator 15 and cooling water cooled by the evaporator 36 of the air-conditioning device. The injection device 24 is cooled due to heat radiation with the cooling water.

As illustrated in FIGS. 3 to 7, the cooling water supply pipe 25 branches off from the second cooling water pipe 35b that extends from the water jacket of the cylinder block 10a to the cooling water channel of the turbo charger 32 in the engine 10. After branching off from the second cooling water pipe 35b, the cooling water supply pipe 25 extends from the inside to the outside of the engine 10, and bends downward and then extends upward to the right edge part of the connecting pipe 23.

As illustrated in FIGS. 4 to 7, the cooling water supply pipe 25 has a top point 25a above the right edge part of the connecting pipe 23. The cooling water supply pipe 25 extends obliquely downward from the top point 25a and is finally connected to the injection device 24. Specifically, the cooling water supply pipe 25 extends obliquely upward from the injection device 24 to the top point 25a. The point where the cooling water supply pipe 25 is connected to the injection device 24 is a connection point 25b. The cooling water supply pipe 25 extends along the longitudinal direction of the connecting pipe 23.

The cooling water supply pipe 25 has a convection section 25c that is connected to the injection device 24 and that extends upward from the injection device 24. Specifically, the convection section 25c of the cooling water supply pipe 25 is a section of the cooling water supply pipe 25 between the connection point 25b and the top point 25a. The convection section 25c is supported by the mounting brackets 29c of the supporting member 29 in order to maintain an orientation of extending obliquely upward from the connection point 25b toward the top point 25a. Specifically, the convection section 25c is supported by the mounting brackets 29c of the supporting member 29 near the top point 25a and in the middle of the convection section 25c.

The cooling water return pipe 26 is a pipe for supplying cooling water that has absorbed heat from the injection device 24 to the evaporator 36 of the air-conditioning device. The cooling water return pipe 26 is connected to the injection device 24 and extends obliquely upward from a connection point 26b that is connected to the injection device 24. The cooling water return pipe 26 extends along the longitudinal direction of the connecting pipe 23.

The cooling water return pipe 26 has a top point 26a near the top point 25a of the cooling water supply pipe 25 and above the right edge part of the connecting pipe 23. As illustrated in FIG. 3, the cooling water return pipe 26 extends downward from the top point 26a to a bottom part of the engine 10. The cooling water return pipe 26 is connected to the third cooling water pipe 35c that extends from the water jacket of the cylinder head 10d of the engine 10 to the evaporator 36 of the air-conditioning device.

As illustrated in FIGS. 4 to 7, the cooling water return pipe 26 has a convection section 26c that is connected to the injection device 24 and that extends upward from the injection device 24. Specifically, the convection section 26c of the cooling water return pipe 26 is a section of the cooling water return pipe 26 from the connection point 26b to the top point 26a. The convection section 26c of the cooling water return pipe 26 is supported by the mounting brackets 29c of the supporting member 29 in order to maintain an orientation of extending obliquely upward from the connection point 26b toward the top point 26a. Specifically, the convection section 26c is supported by the mounting brackets 29c of the supporting member 29 at positions near the top point 26a and the left edge part of the connecting pipe 23. The middle of the convection section 26c is connected to a belowmentioned tank 27. Since the tank 27 is supported by the supporting member 29, the convection section 26c is supported indirectly by the supporting member 29 via the tank 27.

As illustrated in FIG. 4, the tank 27 is provided in the middle in the longitudinal direction of the convection section 26c of the cooling water return pipe 26. The tank 27 has a roughly cylindrical shape and is fixed to the second plate part 29b of the supporting member 29 in a state in which the longitudinal direction (axial direction) of the tank 27 follows the longitudinal direction of the connecting pipe 23. The tank 27 has a first port 27a at one end on the left and a second port 27b at the other end on the right to enable fluid communication with the convection section 26c. The first port 27a is in a position that is lower than the second port 27b.

The convection section 26c is separated into two members, a lower section 26d and an upper section 26e, with the tank 27 acting as the border. The lower section 26d is connected between the injection device 24 and the first port 27a, and the upper section 26e is connected to the second port 27b and extends from the second port 27b to the top point 26a. As a result, the cooling water flowing inside the convection section 26c is temporarily stored inside the tank 27. While not limited in particular due to variations according to the vehicle class, the total capacity of the cooling water that can be stored inside the convection section 25c, the convection section 26c, and the tank 27 is preferably a capacity that allows for cooling of the injection device 24 even after the engine 10 has stopped, and may be, for example, 200 ml or more.

(Characteristics)

The exhaust gas post-treatment unit 20 and the hydraulic excavator 100 carrying the exhaust gas post-treatment unit 20 according to the present embodiment have the following characteristics.

(1) The abovementioned exhaust gas post-treatment unit 20 stores cooling water inside the convection section 25c of the cooling water supply pipe 25 and inside the convection section 26c of the cooling water return pipe 26 even after the engine has stopped. The convection sections 25c and 26c that store the cooling water extend upward from the injection device 24. As a result, after the engine has stopped, the cooling water with a high temperature due to absorbing heat from the injection device 24 moves upward inside the convection sections 25c and 26c, and the cooling water with a relatively low temperature in the upper sections of the convection sections 25c and 26c moves downward toward the injection device 24. Specifically, a convection current due to heat (heat convection) is generated in the cooling water stored inside the convection sections 25c and 26c after the engine has stopped. In this way, the injection device 24 is cooled by heat convection of the cooling water stored inside the convection section 25c of the cooling water supply pipe 25 and inside the convection section 26c of the cooling water return pipe 26. The convection sections 25c, and 26c which extend upward through the entirety thereof may have portions that extend horizontally if an allowable degree of heat convection is present in the cooling water inside the convection sections 25c and 26c due to heat from the injection device 24.

From the point of view of the abovementioned heat convection, the difference in height between the top point 25a and the connection point 25b of the convection section 25c of the cooling water supply pipe 25 and the difference in height between the top point 26a and the connection point 26b of the convection section 26c of the cooling water return pipe 26, are preferably greater; however, too much of a difference in the heights thereof is not desirable from the point of view of space inside the engine room 8. While the differences in height may vary due to differences in the lengths of the convection sections 25c and 26c and the diameters of the convection sections 25c and 26c, the differences in height between the top points 25a and 26a and the connection points 25b and 26b of the convection sections 25c and 26c are preferably 100 mm or more for example.

(2) The convection sections 25c and 26c in the exhaust gas post-treatment unit 20 extend obliquely upward from the injection device 24 and do not extend vertically upward. As a result, the height of the engine hood 12 can be suppressed while allowing for the abovementioned heat convection.

(3) The heat convection of the cooling water can be generated in a stable manner inside the convection sections 25c and 26c after the engine 10 has stopped due to the convection sections 25c and 26c being held in an orientation of extending upward from the injection device 24 by the supporting member 29.

(4) A sufficient capacity of cooling water can be assured for cooling the injection device 24 due to heat convection after the engine 10 has stopped since the tank 27 for temporarily storing the cooling water is provided.

(5) Particulate matter in the exhaust gas can be reduced due to the diesel particulate filtering device 21. Moreover, the exhaust gas post-treatment unit 20 can be contained inside the engine room 8 effectively since the convection sections 25c and 26c are installed along the longitudinal direction of the connecting pipe 23.

(6) The installation of a new source of motive power other than the engine 10 is not required since motive power for the cooling water pump 28 can be obtained from the engine. The exhaust gas post-treatment unit 20 according to the present embodiment is particularly effective when cooling water is supplied by using the cooling water pump 28 that is stopped when the engine is stopped in this way.

MODIFIED EXAMPLES

While an embodiment of the present invention has been described above, the present invention is not limited to the embodiment and the following modifications may be made within the scope of the present invention.

Modified Example 1

While both the convection section 25c of the cooling water supply pipe 25 and the convection section 26c of the cooling water return pipe 26 extend upward from the injection device 24 in the present embodiment, either one of the convection sections may extend upward.

Modified Example 2

While the convection sections 25c and 26c extend obliquely upward from the injection device 24 in the above embodiment, the convection sections 25c and 26c may extend vertically upward from injection device 24.

Modified Example 3

While the top point 25a of the convection section 25c matches the top point of the cooling water supply pipe 25 in the above embodiment, the above embodiment is not limited as such. Specifically, the top point 25a of the convection section 25c is separate from the top point of the cooling water supply pipe 25 and may be positioned lower than the top point of the cooling water supply pipe 25. The cooling water return pipe 26 is similar.

Modified Example 4

The tank 27 may be connected to the top point 26a of the convection section 26c of the cooling water return pipe 26. Specifically, the top point 26a of the convection section 26c and the first port 27a of the tank 27 may be connected.

Modified Example 5

While the tank 27 is installed in the convection section 26c of the cooling water return pipe 26, the above embodiment is not limited as such in particular. The tank 27 may be installed in the convection section 25c of the cooling water supply pipe 25. Moreover, tanks 27 may be provided in both the convection section 25c of the cooling water supply pipe 25 and in the convection section 26c of the cooling water return pipe 26.

Modified Example 6

The support of the convection sections 25c and 26c by the supporting member 29 is not limited to that of the above embodiment, and, for example, the supporting member 29 may support the convection sections 25c and 26c only at the top points 25a and 26a of the convection sections 25c and 26c.

Modified Example 7

The supporting member 29 directly supports the convection sections 25c and 26c in the above embodiment but is not limited as such, and the supporting member 29 may not support the convection sections 25c and 26c directly. For example, when the convection sections 25c and 26c are connected to the tank 27, the convection sections 25c and 26c may be supported indirectly due to the supporting member 29 supporting the tank 27 directly.

Modified Example 8

While the supporting member 29 is fixed to the connecting pipe 23, the fixing position of the supporting member 29 is not limited to this position. For example, the supporting member 29 may be fixed to the vehicle frame, the vehicle cover, or the engine hood 12 and the like.

Modified Example 9

While the convection section 25c and other sections of the cooling water supply pipe 25 are configured as one pipe in the above embodiment, the convection section 25c and the other sections may be configured as different members. The cooling water return pipe 26 is similar.

Modified Example 10

The diameters of the convection sections 25c and 26c may be modified in order to ensure that there is a sufficient volume of cooling water stored inside the convection sections 25c and 26c for cooling the injection device 24 by heat convection.

Modified Example 11

While an example of a hydraulic excavator applicable to the present invention has been described in the above embodiment, the construction vehicle applicable to the present invention is not limited to a hydraulic excavator. For example, a bulldozer, a wheel loader, or a motor grader and the like may be applied to the present invention.

What is claimed is:

1. An exhaust gas post-treatment unit comprising:
    a diesel particulate filtering device configured to treat engine exhaust gas;
    a selective catalyst reduction device configured to treat the engine exhaust gas;
    a connecting pipe connecting the diesel particulate filtering device and the selective catalyst reduction device;
    an injection device disposed on the connecting pipe, the injection device injecting a reducing agent into the exhaust gas supplied to the selective catalyst reduction device;
    a cooling water supply pipe configured to guide cooling water to the injection device to cool the injection device; and
    a cooling water return pipe configured to discharge the cooling water from the injection device,
    the cooling water supply pipe and the cooling water return pipe having respectively a convection section extending upward along the connecting pipe from a connecting portion with the injection device, the convection sections extend obliquely upward from the injection device in a longitudinal direction of the connecting pipe.

2. The exhaust gas post-treatment unit according to claim 1, further comprising
    a cooling water pump driven by motive engine power, the cooling water pump being configured to supply cooling water to the injection device via the cooling water supply pipe.

3. The exhaust gas post-treatment unit according to claim 1, further comprising
    a reservoir part connected to at least one of the convection sections above the injection device, the reservoir part storing cooling water.

4. The exhaust gas post-treatment unit according to claim 1 further comprising
    a first supporting member configured to support the convection sections.

5. A construction vehicle including the exhaust gas post-treatment unit of claim 1, the construction vehicle further comprising:
    an engine; and
    working equipment.

6. The exhaust gas post-treatment unit according to claim 1, further comprising a first supporting member configured to support the convection sections.

7. A construction vehicle including the exhaust gas post-treatment unit of claim 6, the construction vehicle further comprising:
    an engine; and
    working equipment.

8. A construction vehicle including the exhaust gas post-treatment unit of claim 1, the construction vehicle further comprising:
    an engine; and
    working equipment.

9. The construction vehicle according to claim 8, wherein the exhaust gas post-treatment unit is disposed above the engine.

10. The exhaust gas post-treatment unit according to claim 1, further comprising a cooling water pump driven by motive engine power, the cooling water pump being configured to supply cooling water to the injection device via the cooling water supply pipe.

11. The exhaust gas post-treatment unit according to claim 10, further comprising
    a reservoir part connected to at least one of the convection sections above the injection device, the reservoir part storing cooling water.

12. The exhaust gas post-treatment unit according to claim 10, further comprising
    a first supporting member configured to support the convection sections.

13. A construction vehicle including the exhaust gas post-treatment unit of claim 10, the construction vehicle further comprising:
    an engine; and
    working equipment.

14. The exhaust gas post-treatment unit according to claim 1, further comprising
    a reservoir part connected to at least one of the convection sections above the injection device, the reservoir part storing cooling water.

15. The exhaust gas post-treatment unit according to claim 14, further comprising
    a second supporting member installed on the connecting pipe and supporting the reservoir part.

16. The exhaust gas post-treatment unit according to claim 14, further comprising
    a first supporting member configured to support the convection sections.

17. A construction vehicle including the exhaust gas post-treatment unit of claim 14, the construction vehicle further comprising:
    an engine; and
    working equipment.

18. An exhaust gas post-processing unit comprising:
    a diesel particulate filtering device configured to treat engine exhaust gas;
    a selective catalyst reduction device configured to treat the engine exhaust gas;
    a connecting pipe connecting the diesel particulate filtering device and the selective catalyst reduction device;
    an injection device disposed on the connecting pipe, the injection device injecting a reducing agent into the exhaust gas supplied to the selective catalyst reduction device;
    a cooling water supply pipe configured to guide cooling water to the injection device to cool the injection device;

a cooling water return pipe configured to discharge the cooling water from the injection device;

a reservoir part configured to store cooling water;

the cooling water supply pipe and the cooling water return pipe having respectively a convection section extending upward from a connecting portion with the injection device; and at least one of the convection sections being connected to the reservoir part above the injection device.

* * * * *